United States Patent [19]

Poucher

[11] Patent Number: 4,822,243

[45] Date of Patent: Apr. 18, 1989

[54] BLADED ROTOR ASSEMBLIES AND CONTROL MEANS THEREFOR

[75] Inventor: Michael Poucher, Charlton Kings, England

[73] Assignee: Dowty Rotol Limited, England

[21] Appl. No.: 38,027

[22] Filed: Apr. 14, 1987

[30] Foreign Application Priority Data

Apr. 18, 1986 [GB] United Kingdom ............... 8609554

[51] Int. Cl.⁴ ............................................. B64C 11/40
[52] U.S. Cl. ....................................... 416/49; 416/48; 416/157 R
[58] Field of Search ................. 416/48, 49, 157 R, 46, 416/47; 415/129, 130

[56] References Cited

U.S. PATENT DOCUMENTS

| | | | |
|---|---|---|---|
| 2,456,361 | 12/1948 | Atteslander | 416/157 R |
| 2,958,381 | 11/1960 | Stevens et al. | 416/157 R |
| 2,959,156 | 11/1960 | Dreptin | 416/61 |
| 3,057,410 | 10/1962 | Biermann | 416/48 |
| 3,228,480 | 1/1966 | Jörgensen | 416/157 R |
| 3,229,771 | 1/1966 | Hedberg | 416/49 X |
| 3,242,992 | 3/1966 | Quenneville et al. | 416/157 R |
| 3,389,641 | 6/1968 | Barnes | 416/157 R X |
| 3,711,221 | 1/1973 | Almqvist | 416/157 R |

FOREIGN PATENT DOCUMENTS

| | | | |
|---|---|---|---|
| 1926416 | 2/1971 | Fed. Rep. of Germany | 416/157 R |
| 1260746 | 4/1961 | France | 416/49 |
| 157784 | 12/1982 | German Democratic Rep. | 416/157 R |
| 581327 | 10/1946 | United Kingdom | 416/47 |

Primary Examiner—Everette A. Powell, Jr.
Attorney, Agent, or Firm—Davis, Bujold & Streck

[57] ABSTRACT

A bladed rotor assembly and a control means therefor, which comprises a bladed rotor, a fluid-pressure-operable actuator for effecting a change of blade pitch, a first valve member connect to, and movable with the actuator and a second valve member co-operable with the first valve member, both valve mebmers having fluid passageways therein for supplying fluid to the actuator, and override means being provided to control the position of the second valve member relative to the first valve member, wherein safety means are provided to cause, in the event of failure of the over-ride means, the actuator to effect increased blade pitch.

8 Claims, 1 Drawing Sheet

U.S. Patent
Apr. 18, 1989
4,822,243
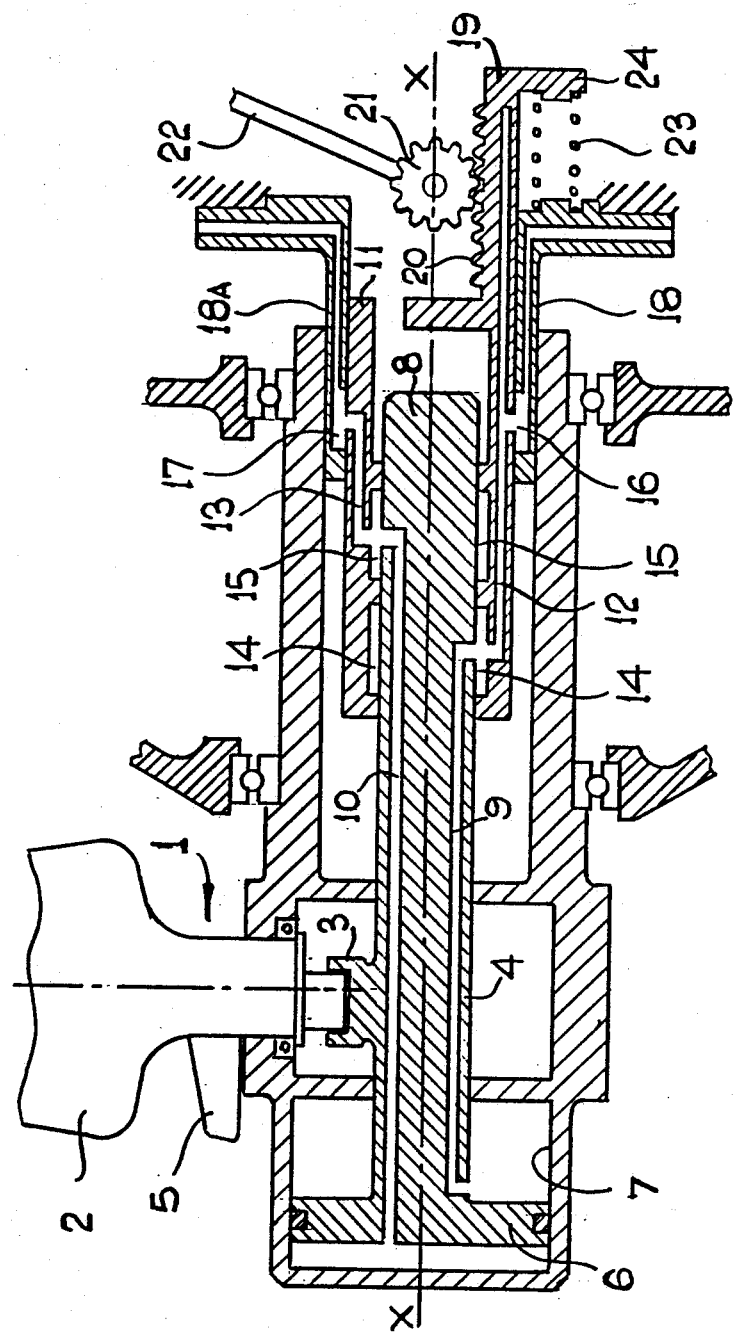

BLADED ROTOR ASSEMBLIES AND CONTROL MEANS THEREFOR

This invention relates to bladed rotor assemblies and more particularly to means for controlling the pitch of such assemblies.

It is well known that the speed of an aircraft engine can be adjusted by controlling, and adjusting when appropriate, the pitch of the individual propeller blades. Commonly an engine speed governor is utilised to prompt a pitch actuator which is usually operated by hydraulic means.

In the event of a failure of the actuator, means must be provided to avoid the failure causing the propeller pitch to endanger the aircraft. For example, an engine may be operating at a predetermined fine pitch and adequate precautions must be taken to obviate the possibility of an even lower pitch being adopted in the event of a failure.

The present invention is concerned with the provision of such precautions in pitch actuators employing a beta-valve system in particular.

In accordance with the invention, there is provided a bladed rotor assembly and a control means therefor, which comprises a bladed rotor, a fluid-pressure-operable actuator for effecting a change of blade pitch, a first valve member connected to, and movable with, the actuator and having first and second passageways therein for supplying fluid to the actuator for reducing and increasing the pitch of the rotor blade respectively, and a second valve member cooperable with the first valve member and having first and second passageways therein for supplying fluid to the first and second first valve member passageways respectively at least when the rotor blades are within a normal operating range of pitch, and override means being provided to control the position of the second valve member relative to the first valve member, wherein safety means are provided to cause, in the event of failure of the over-ride means, the actuator to effect increased blade pitch.

The actuator can usefully comprise a double acting piston movable in a cylinder and being operatively connected to each of the rotor blades, for example via an eccentric link, to effect a change of blade pitch. In such cases, the piston can be connected via a piston rod to the first valve member or could be integral therewith.

In any event, the first valve member, often known as the beta-valve, is preferably cylindrical in shape and the second valve member, often known as the beta-sleeve, is preferably tubular in shape with an internal diameter which allows it to fit closely over the beta valve.

The first and second passageways of the first valve members must be capable of communicating with the first and second passageways respectively of the second valve member and be capable of communicating the first passageways with a source of fluid and communicating the second passageways with a further, separate source of fluid and thereby control the actuator. In the case of a piston actuator, the first source of fluid will act on one side of the piston to cause a blade coarsening effect and the second source of fluid will act on the other side of the piston to cause a blade fining effect or vice-versa.

The means of communication between the passgeways of the first and second valve members and between the sources of the fluid and the passageways of the second valve member can conveniently include annular supply galleries arranged so that the passageways in th first valve member can communicate with them over a predetermined range of relative movement between the valve members. The over-ride means is preferably provided by an extension to the second valve member, or beta-sleeve, and a mechanical drive means associated with it, for example a rack and pinion drive means operated independently, usually by the pilot, of the control means. With a rack and pinion, the pinion drive can usefully pass between fixed planet gears of the main propeller shaft gearbox.

In accordance with standard practice, the rotor blades will normally be biassed in use towards a coarse pitch by mechanical means, for example counterweights.

However, in the event of a failure of the override means, the invention provides safety means to ensure the blades adopt a coarser, or increased, blade pitch.

In a preferred embodiment of the invention, the safety means is associated with an extension of the second valve member and comprises a closed fluid conduit incorporated therein, the closed fluid conduit communicates with the fluid passageway in the second valve member which, in use, carries fluid for reducing the blade pitch wherein in the event of fracture of the extension, pitch reducing fluid pressure will be reduced and the actuator will adopt a coarser blade mode.

In another embodiment, an alternative supplementary or additional safety means comprises the provision of spring means to bias the second valve member towards a pitch coarsening mode and operable in the event of failure of mechanical drive means acting on the second valve means.

Specifically, the invention also provides a bladed rotor assembly and a control means therefor comprising a bladed rotor having a plurality of rotor blades, each of said rotor blades being urged in use towards a coarse pitch by mechanical means, a fluid-pressure-operable actuator having a double acting piston movable in a cylinder, the piston being operatively connected to each of said rotor blades to effect a change of pitch thereof, a first valve member connected to said piston and having a first fluid passageway formed integrally therein to supply fluid at pressure to one side of the piston to reduce the pitch of the rotor blades and a second passageway formed integrally therein to supply fluid at pressure to the other side of the piston to coarsen the pitch of the rotor blades, and a second valve member co-operable with said first valve member and having a first fluid pressure transfer means formed integrally therein for co-operation, at least when the rotor blades are within a normal operating range of pitch, with said first passageway and a second fluid pressure transfer means for co-operation with said second passageway, the second valve member being adapted for co-operation with a mechanical drive means to move said second valve member in a direction to effect a reduction, or increase in the pitch of the rotor blades wherein the first fluid pressure transfer means includes a first supply gallery for co-operation with said first passageway and fluid pressure conduit means to connect the first supply gallery in use to a source of fluid at pressure, said fluid pressure conduit means extending along the second valve member from a position adjacent to that where the second valve member is adapted for co-operation with said drive means to a position where it enters said first supply gallery thereby ensuring that in the event of a failure of said second valve member the fluid pressure causing a reduction in pitch of the rotor blades will be dumped to allow the pitch of the rotor blades to be coarsened under the influence of said mechanical means.

To exemplify the invention, reference will now be made to the accompanying drawing which shows a schematic cross-sectional view through a bladed rotor assembly and control means in accordance with the invention.

With refernce to the drawings, a bladed rotor assembly 1 has a plurality of blades 2 attached to flanges 3 of a shaft 4 and is rotatable about an axis x—x.

The bladed rotor assembly comprises a number of rotor blades 2 each biassed towards a coarse pitch by mechanical means in the form of counterweights 5. The shaft 4 provides an operable connection between each of the rotor blades 2 and a double-acting piston 6 contained within and co-operating with a cylinder 7 to form a fluid-pressure-operable actuator.

A first valve member 8 (the beta valve) of generally cylindrical shape is connected to and rotatable with, the piston 6 via the shaft 4 (of which it forms an integral part) and has a first fluid passageway 9 formed therein to connect with one side of the piston 6. The first valve member 8 also has passageway 10 formed therein to connect with the other side of the piston 6. A second valve member 11 (the beta sleeve) of generally tubular shape has an internal diameter which allows it closely to co-operate with the first valve member 8 through relative movement between the members in the direction of the axis x—x. The second valve member 11 does not rotate with the shaft 4 and the first valve member 8.

The second valve member 11 also has a first fluid passageway 12 and a second fluid passageway 13 and these communicate, at a predetermined range of relative positions of the first and second valve members, with the first and second fluid passageways respectively of the first valve member via annular grooves or galleries 14 and 15 respectively.

The other ends of the passageways 12 and 13 of the second valve member 11 communicate with other parts of the control assembly (not shown), and with respective sources of fluid pressure in particular, via further galleries 16 and 17 defined in non-moving parts 18, 18A of the assembly.

An extension 19 of the second valve member 11 is adapted by means of a rack 20 for co-operation with a mechanical drive means in the form of a pinion 21 operated externally via link means 22. The mechanical drive passes between fixed planet gears of the main gearbox.

A spring 23 is positioned between the part 18 and a flange 24 of the extension 19. The first fluid passageway 12 of the second valve member 11 extends across essentially the whole length of the extension 19 but the passageway is closed within the extension.

In use of the rotor assembly and its control means, two separate sources of fluid pressure are available, the first source is communicated to the right hand side of the piston 6 (as shown in the drawing) via gallery 16, passageway 12, gallery 14 passageway 9 and the second source is communicated to the left hand side of the piston 6 via gallery 17, passageway 13, gallery 15 and passageway 10.

The first source of fluid will therefore tend to move the piston 6 to the left and will move the shaft 4 to the left also and reduce the pitch of the rotor blades. The second source of fluid will tend to move the piston and shaft to the right and increase the pitch of the rotor blades. In some arrangements this second source may be drain pressure only allowing the increase of pitch to be achieved by the counterweights.

When the rotor blades are within a normal operating range of pitch, the piston 6 is movable to the left to reduce the pitch until the end of passageway 9 ceases to be in communication with the gallery 14, thereby cutting off the pressure to that side of the piston. It should be noted that if the piston 6 moves any further to the left, the fluid in passageway 9 will be directed to drain means. However, if it is necessary further to reduce the pitch (into the beta range), the second valve member 11, as over-ride means can be moved to the left (relative to the first valve member 8) by means of the rack 20 and pinion 21 by external (normally pilot operated) link means 22 and thereby reconnect the passageway 9 with the gallery 14.

Similarly, the over-ride means of the second valve member 11 can be used to control the communication between the passageway 10 and the gallery 15. In all normal uses, the passageways 12 and 13 will communicate with the galleries 16 and 17 respectively.

If at any time the second valve member 11 is broken, especially in the vicinity of the extension 19, the fluid pressure in passageway 12 and hence the fluid pressure acting on the piston 6 in a manner to effect lower rotor blade pitch will be reduced because this pressurized fluid is dumped out through the fracture in the extension 19 by way of passageway, thereby ensuring that the blades will automatically coarsen under the influence of counter weights 5 to a safe pitch.

Equally, if at any time the link between the rack 20 and pinion 21 is broken, or there is a break in the link means 22, the action of the spring 23 on the flange 24 of the extension 19 will ensure that the assembly is set in an auto-coarsening mode.

We claim:

1. A bladed rotor assembly and a control means therefor, which comprises a bladed rotor, a fluid-pressure operable actuator for effecting a change of blade pitch, a first valve member connected to, and movable with, the actuator and having first and second passageways therein for supplying fluid to the actuator for reducing and increasing the pitch of the rotor blade, respectively, and a second valve member co-operable with the first valve member, the second valve member having first and second passageways therein for supplying fluid to the first and second passageways, respectively, of the first valve member, at least when the rotor blades are within a normal operating range of pitch, and mechanical override means being provided to control the position of the second valve member relative to the first valve member, wherein safety means associated with the actuator automatically effects increased blade pitch whenever there is a failure of the mechanical override means.

2. An assembly according to claim 1 in which the actuator comprises a double acting piston movable in a cylinder.

3. An assembly according to claim 2 in which the actuator is operatively connected to each of the rotor blades via an eccentric link.

4. An assembly according to claim 2 in which the piston is integral with the first valve member.

5. An assembly according to claim 1 in which the override means comprises an extension to the second valve member and an associated mechanical drive means.

6. An assembly according to claim 5 in which the mechanical drive means is a rack and pinion drive means.

7. A bladed rotor assembly and a control means therefor, which comprises a bladed rotor, a fluid-pressure-operable actuator for effecting a change of blade pitch, a first valve member connected to, and movable with, the actuator and having first and second passageways therein for supplying fluid to the actuator for reducing and increasing the pitch of the rotor blade, respectively, and a second valve member co-operable with the first valve member, the second valve member having first and second passageways therein for supplying fluid to the first and second passageways, respectively, of the first valve member, at least when the rotor blades are within a normal operating range of pitch, and mechanical override means being provided to control the position of the second valve member relative to the first valve member, and safety means are provided to cause, in the event of failure of the mechanical override means, the actuator to effect increased blade pitch, wherein the safety means is associated with an extension of the second valve member and comprises a closed fluid conduit incorporated in the second valve member, said closed fluid conduit communicates with the fluid passageway in the second valve member which, in use, carries fluid to the actuator for reducing the blade pitch.

8. A bladed rotor assembly and a control means therefor, which comprises a bladed rotor, a fluid-pressure-operable actuator for effecting a change of blade pitch, a first valve member connected to, and movable with, the actuator and having first and second passageways therein for supplying fluid to the actuator for reducing and increasing the pitch of the rotor blade, respectively, and a second valve member co-operable with the first valve member, the second valve member having first and second passageways therein for supplying fluid to the first and second passageways, respectively, of the first valve member, at least when the rotor blades are within a normal operating range of pitch, and mechanical override means being provided to control the position of the second valve member relative to the first valve member, and safety means are provided to cause, in the event of failure of the mechanical override means, the actuator to effect increased blade pitch, wherein the safety means comprises spring means to bias the second valve member toward a pitch coarsening mode.

* * * * *